US012711052B2

(12) United States Patent
Selvaraj et al.

(10) Patent No.: US 12,711,052 B2
(45) Date of Patent: Aug. 18, 2026

(54) SCALABLE AND AUTOMATED SOFTWARE CODE DEVELOPMENT PIPELINE

(71) Applicant: Capital One Services, LLC, McLean, VA (US)

(72) Inventors: Sugavaneswaran Selvaraj, Frisco, TX (US); Nag Prajval Bindumalyam Chandrashekar, Little Elm, TX (US); Michelle Yu, Murphy, TX (US); Christian Schommer, Dallas, TX (US); Kevin Wissink, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 197 days.

(21) Appl. No.: 18/503,589

(22) Filed: Nov. 7, 2023

(65) Prior Publication Data

US 2025/0147872 A1 May 8, 2025

(51) Int. Cl.
*G06F 11/3698* (2025.01)
*G06F 8/77* (2018.01)

(52) U.S. Cl.
CPC ............ *G06F 11/3698* (2025.01); *G06F 8/77* (2013.01)

(58) Field of Classification Search
None
See application file for complete search history.

(56) References Cited

U.S. PATENT DOCUMENTS 10,083,027 B2 9/2018 Moorthi et al.
10,331,440 B2 6/2019 Mallisetty et al.
12,079,106 B1 * 9/2024 Hu .......................... G06N 3/044
2018/0060065 A1 * 3/2018 Lai ............................ G06F 8/71
2020/0125485 A1 * 4/2020 Wiener ............... G06F 11/3698
2020/0201606 A1 * 6/2020 Hoffmann ................. G06F 8/60
2021/0248058 A1 * 8/2021 Hattingh ............. G06F 11/3698
2022/0131865 A1 * 4/2022 Lev Ran ............... H04L 63/102

(Continued)

OTHER PUBLICATIONS

Q. Chen, D. Kong, L. Bao, C. Sun, X. Xia and S. Li, "Code Reviewer Recommendation in Tencent: Practice, Challenge, and Direction," 2022 IEEE/ACM 44th International Conference on Software Engineering: Software Engineering in Practice (ICSE-SEIP), Pittsburgh, PA, USA, 2022, pp. 115-124. (Year: 2022).*

(Continued)

*Primary Examiner* — Andrew M. Lyons
(74) *Attorney, Agent, or Firm* — Harrity & Harrity, LLP

(57) ABSTRACT

In some implementations, a code testing device may receive, from a first device associated with a developer, a first instruction to merge a first code branch. The code testing device may perform a first set of tests, associated with a first environment, in response to the first instruction. The code testing device may merge the first code branch based on the first set of tests resulting in a passing outcome for the first code branch. The code testing device may receive, from a second device associated with a reviewer, a second instruction to deploy the merged first code branch. The code testing device may perform a second set of tests, associated with a second environment, in response to the second instruction. The code testing device may deploy the merged first code branch based on the second set of tests resulting in a passing outcome for the merged first code branch.

20 Claims, 8 Drawing Sheets

(56) References Cited

U.S. PATENT DOCUMENTS

| | | | | |
|---|---|---|---|---|
| 2023/0039744 | A1* | 2/2023 | Herblot | G06F 8/71 |
| 2023/0095634 | A1* | 3/2023 | Muralidharan | G06F 11/0784 714/57 |
| 2023/0140552 | A1* | 5/2023 | Turgut | G06Q 10/101 717/124 |
| 2023/0275764 | A1* | 8/2023 | Manning | H04L 9/3247 713/176 |
| 2024/0281248 | A1* | 8/2024 | Shah | G06F 8/77 |

OTHER PUBLICATIONS

N. Sadman, M. M. Ahsan and M. A. Parvez Mahmud, "ADCR: An Adaptive TOOL to select "Appropriate Developer for Code Review" based on Code Context," 2020 11th IEEE Annual Ubiquitous Computing, Electronics & Mobile Communication Conference (UEMCON), New York, NY, USA, 2020, pp. 0583-0591. (Year: 2020).*

Abdi Suryadinata Telaga, et al., "Development of Quality Assurance Automatic Testing Script to Increase Testing Efficiency for Mobile Applications," Jurnal Pengabdian Masyarakat Abditeknoyasa, vol. 3, No. 2 (2022), pp. 148-151.

* cited by examiner

300
Bus 310
Processor 320
Memory 330
Input Component 340
Output Component 350
Communication Component 360

SCALABLE AND AUTOMATED SOFTWARE CODE DEVELOPMENT PIPELINE

BACKGROUND

In developing code for software applications, multiple developers often submit contributions to merge into code branches. Merged code branches are generally combined and deployed for additional testing before release to customers.

SUMMARY

Some implementations described herein relate to a system for scalable and automated code testing. The system may include one or more memories and one or more processors communicatively coupled to the one or more memories. The one or more processors may be configured to receive, from a first device associated with a first developer, a first instruction to merge a first code branch. The one or more processors may be configured to perform a first set of tests, associated with a first environment, in response to the first instruction. The one or more processors may be configured to merge the first code branch based on the first set of tests resulting in a passing outcome for the first code branch. The one or more processors may be configured to assign the merged first code branch to a first reviewer. The one or more processors may be configured to receive, from a second device associated with a second developer, a second instruction to merge a second code branch. The one or more processors may be configured to perform the first set of tests, associated with the first environment, in response to the second instruction. The one or more processors may be configured to merge the second code branch based on the first set of tests resulting in a passing outcome for the second code branch. The one or more processors may be configured to assign the merged second code branch to a second reviewer. The one or more processors may be configured to receive, from a third device associated with the first reviewer, a third instruction to deploy the merged first code branch. The one or more processors may be configured to perform a second set of tests, associated with a second environment, in response to the third instruction. The one or more processors may be configured to deploy the merged first code branch based on the second set of tests resulting in a passing outcome for the merged first code branch. The one or more processors may be configured to assign the deployed first code branch to a third reviewer that is different than the first reviewer.

Some implementations described herein relate to a method of scalable and automated code testing. The method may include receiving, from a first device associated with a first developer, a first instruction to merge a first code branch. The method may include performing, by a code testing device, a first set of tests, associated with a first environment, in response to the first instruction. The method may include merging, by a code repository, the first code branch based on the first set of tests resulting in a passing outcome for the first code branch. The method may include receiving, from a second device associated with a second developer, a second instruction to merge a second code branch. The method may include performing, by the code testing device, the first set of tests, associated with the first environment, in response to the second instruction. The method may include merging, by the code repository, the second code branch based on the first set of tests resulting in a passing outcome for the second code branch. The method may include receiving, from a third device associated with a first reviewer, a third instruction to deploy the merged first code branch. The method may include performing, by the code testing device, a second set of tests, associated with a second environment, in response to the third instruction. The method may include deploying, by the code repository, the merged first code branch based on the second set of tests resulting in a passing outcome for the merged first code branch.

Some implementations described herein relate to a non-transitory computer-readable medium that stores a set of instructions for scalable and automated code testing. The set of instructions, when executed by one or more processors of a device, may cause the device to receive, from a device associated with a developer, a first instruction to merge a code branch. The set of instructions, when executed by one or more processors of the device, may cause the device to perform a first set of tests, associated with a first environment, in response to the first instruction. The set of instructions, when executed by one or more processors of the device, may cause the device to merge the code branch based on the first set of tests resulting in a passing outcome for the code branch. The set of instructions, when executed by one or more processors of the device, may cause the device to assign the merged code branch to a first reviewer. The set of instructions, when executed by one or more processors of the device, may cause the device to receive, from a device associated with the first reviewer, a second instruction to deploy the merged code branch. The set of instructions, when executed by one or more processors of the device, may cause the device to perform a second set of tests, associated with a second environment, in response to the second instruction. The set of instructions, when executed by one or more processors of the device, may cause the device to deploy the merged code branch based on the second set of tests resulting in a passing outcome for the merged code branch. The set of instructions, when executed by one or more processors of the device, may cause the device to assign the deployed code branch to a second reviewer that is different than the first reviewer.

DETAILED DESCRIPTION

The following detailed description of example implementations refers to the accompanying drawings. The same reference numbers in different drawings may identify the same or similar elements.

In developing code for software applications, multiple teams, each of which has multiple developers, often submit contributions to merge code branches. These contributions may be associated with a same component or a different component of a software application. For example, the software application may have hundreds of components that work together, such that failure of a single component can result in failure of an entire feature or functionality of the software application. Merged code branches are generally combined and deployed for additional testing before release to customers. Sometimes, developers merge code that is untested, which results in testing failures later that waste power and processing resources. Similarly, reviewers sometimes deploy code that is untested, which also results in failures later that waste power and processing resources.

Some implementations described herein enable automated testing of code before merging a code branch. For example, a system may automatically perform low-level environment tests before approving a code merge. As a result, failures in higher-level environment tests are prevented that would otherwise waste power and processing resources in debugging and repairing the merged code. For example, a software application with a large number of components that are developed in parallel is less likely to suffer failure from a single component because the component is automatically tested for quality. Additionally, or alternatively, multiple developers working on a same component may perform tests in different environments (e.g., testing for one type of bug as compared with testing for cybersecurity) before merging code. Additionally, some implementations described herein enable automated testing of merged code before deployment. For example, the system may automatically perform quality assurance tests and/or performance tests before deploying the merged code. As a result, failures of the deployed code are prevented that would otherwise waste power and processing resources in debugging and repairing the deployed code. Therefore, customers that use the deployed code will have an improved experience because the deployed code is more likely to be reliable and high quality. The deployed code may be in a production environment or may be pre-production (e.g., when the customer tests software-as-a-service (SaaS) code before opening the SaaS code to end users).

FIGS. 1A-1E are diagrams of an example 100 associated with scalable and automated code testing. As shown in FIGS. 1A-1E, example 100 includes a code repository, a code testing device, developer devices, reviewer devices, and a customer device. These devices are described in more detail in connection with FIGS. 2 and 3.

Figure 1A:
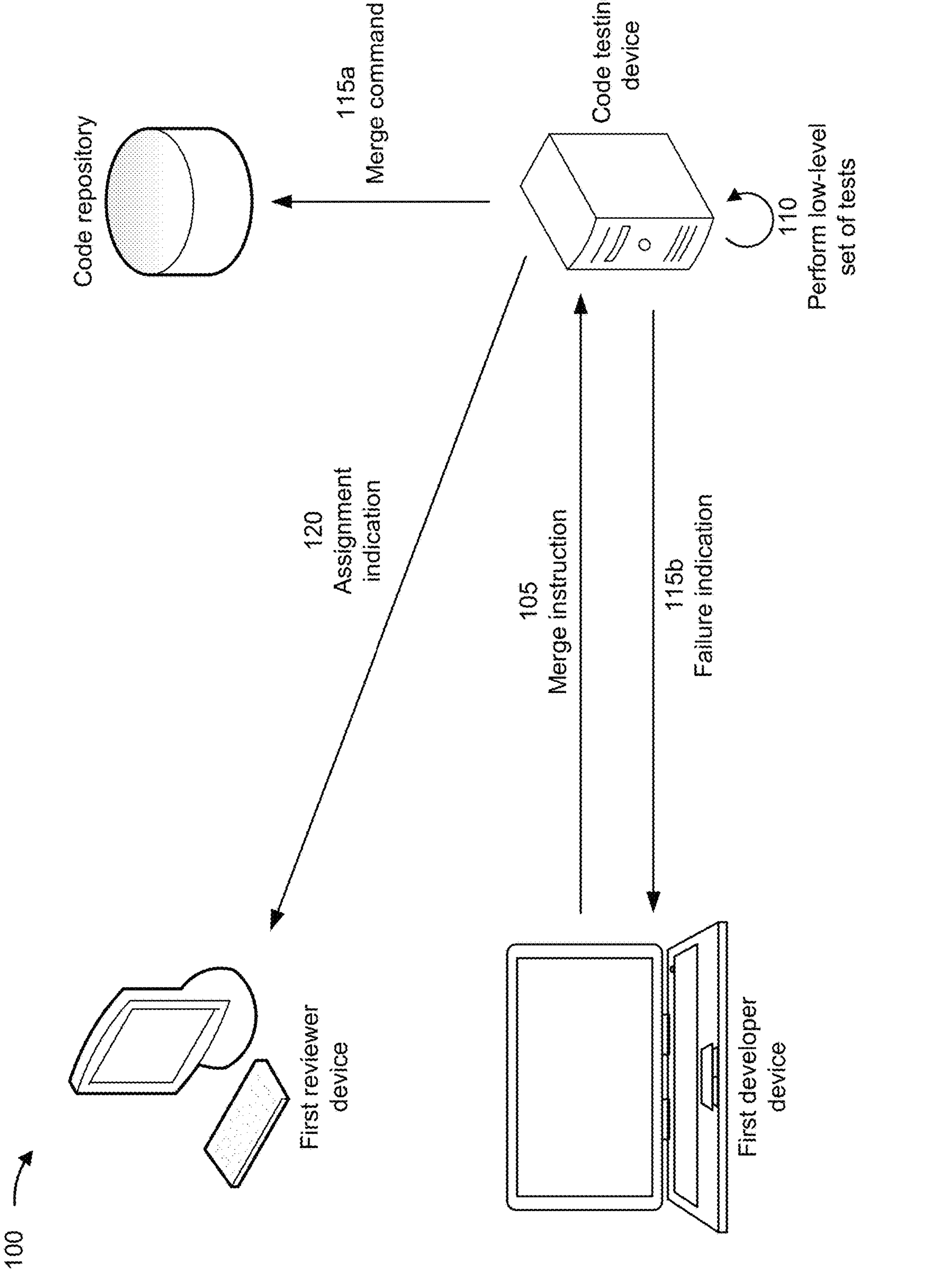
FIGS. 1A-1E are diagrams of an example implementation relating to scalable and automated code testing, in accordance with some embodiments of the present disclosure.

As shown in FIG. 1A and by reference number 105, a first developer device may transmit, and the code testing device may receive, a first instruction to merge a first code branch. For example, a first developer may have modified code using the first developer device and may transmit the first instruction to merge the first code branch, including the modified code, into a parent branch. The first code branch may therefore include a portion of a larger set of code for a software application. In some implementations, the first instruction may be a push command associated with the code repository. For example, the first developer device may transmit the push command to the code repository, via the code testing device, such that the code testing device may perform tests (e.g., as described in connection with reference number 110) before authorizing the push command (e.g., by forward the push command to the code repository). Although the example 100 is described in connection with the first developer, other examples may include the modified code being contributed by a first developer team.

In some implementations, the first developer may interact with a user interface (UI) provided by the first developer device (e.g., output via an output component of the first developer device) in order to trigger the first developer device to transmit the first instruction. For example, the first developer device may execute a web browser that accesses a website hosted by (or at least associated with) the code repository, such that the first developer interacts with the website (e.g., via an input component of the first developer device) to trigger the first developer device to transmit the first instruction.

The first instruction may be included in a hypertext transfer protocol (HTTP) request, a file transfer protocol (FTP) request, and/or an argument in an application programming interface (API) call. In some implementations, the first developer device may transmit, and the code testing device may receive, a set of credentials (e.g., a username and password, a passcode, a certificate, a key, biometric information, among other examples) associated with the first developer. Therefore, the code testing device may receive the first instruction based on verifying the set of credentials (e.g., by opening an API function that the first developer device uses to transmit the first instruction). Alternatively, the first developer device may communicate with a single sign on (SSO) service (e.g., associated with the code repository) and may receive the first instruction based on validating the first developer device using the SSO service.

As shown by reference number 110, the code testing device may perform a first set of tests associated with a first environment. The first set of tests may be low-level environment tests, as shown in FIG. 1A. For example, the first set of tests may include compilation tests (to ensure that the first code branch compiles), operating system (OS) tests (to ensure that the compiled first code does not cause memory leaks and/or other system-level errors), and/or driver tests (to ensure that the compiled first code branch property interacts with drivers), among other examples. The code testing device may automatically perform the first set of tests on the first code branch in response to the first instruction. As a result, the code testing device helps prevent failures in higher-level environment tests (e.g., as described in connection with FIGS. 1C-1D) that would otherwise waste power and processing resources in debugging and repair processes.

In some implementations, the code testing device may compile the first code branch (including the modified code from the first developer device) to generate an executable and may test the executable within a container configured to simulate the first environment. The container may be a cloud-based execution environment configured with an OS and drivers that are associated with the first environment.

As shown by reference number 115*a*, the code testing device may merge the first code branch based on the first set of tests resulting in a passing outcome for the first code branch. For example, the code testing device may forward a push command (e.g., as described above) from the first developer device to the code repository in response to receiving an indication of the passing outcome. The code testing device may forward a message including the push command or may decode a message from the first developer device including the push command, generate a new message re-encoding the push command, and transmit the new message to the code repository.

Alternatively, as shown by reference number 115*b*, the code testing device may refrain from merging the first code branch based on the first set of tests resulting in a failed outcome for the first code branch. For example, the code testing device may transmit, and the first developer device may receive, an indication of the failed outcome (e.g., in response to a push command from the first developer device, as described above). By blocking the push command associated with the code repository, the code testing device prevents problems in the first code branch from propagating to parent branches and causing failures in higher-level environment tests (e.g., as described in connection with FIGS. 1C-1D). Therefore, the first developer may further modify the code to address the failed outcome and re-transmit the first instruction at a later time.

The code testing device may assign the merged first code branch to a first reviewer. For example, the code testing device may select the first reviewer from a set of possible reviewers, where the set is associated with a parent branch into which the first code branch was merged. In some implementations, the code testing device may assign the merged first code branch by submitting a pull request to the code repository. Additionally, or alternatively, as shown by reference number 120, the code testing device may transmit, and a first reviewer device (associated with the first reviewer) may receive, an indication indicating the merged first code branch. The indication may be included in a push notification and/or another type of notification output by an output component of the first reviewer device. Additionally, or alternatively, the code testing device may transmit the indication to an email address (e.g., in an email message) and/or to the phone number (e.g., in a text message) associated with the first reviewer device.

Figure 1B:
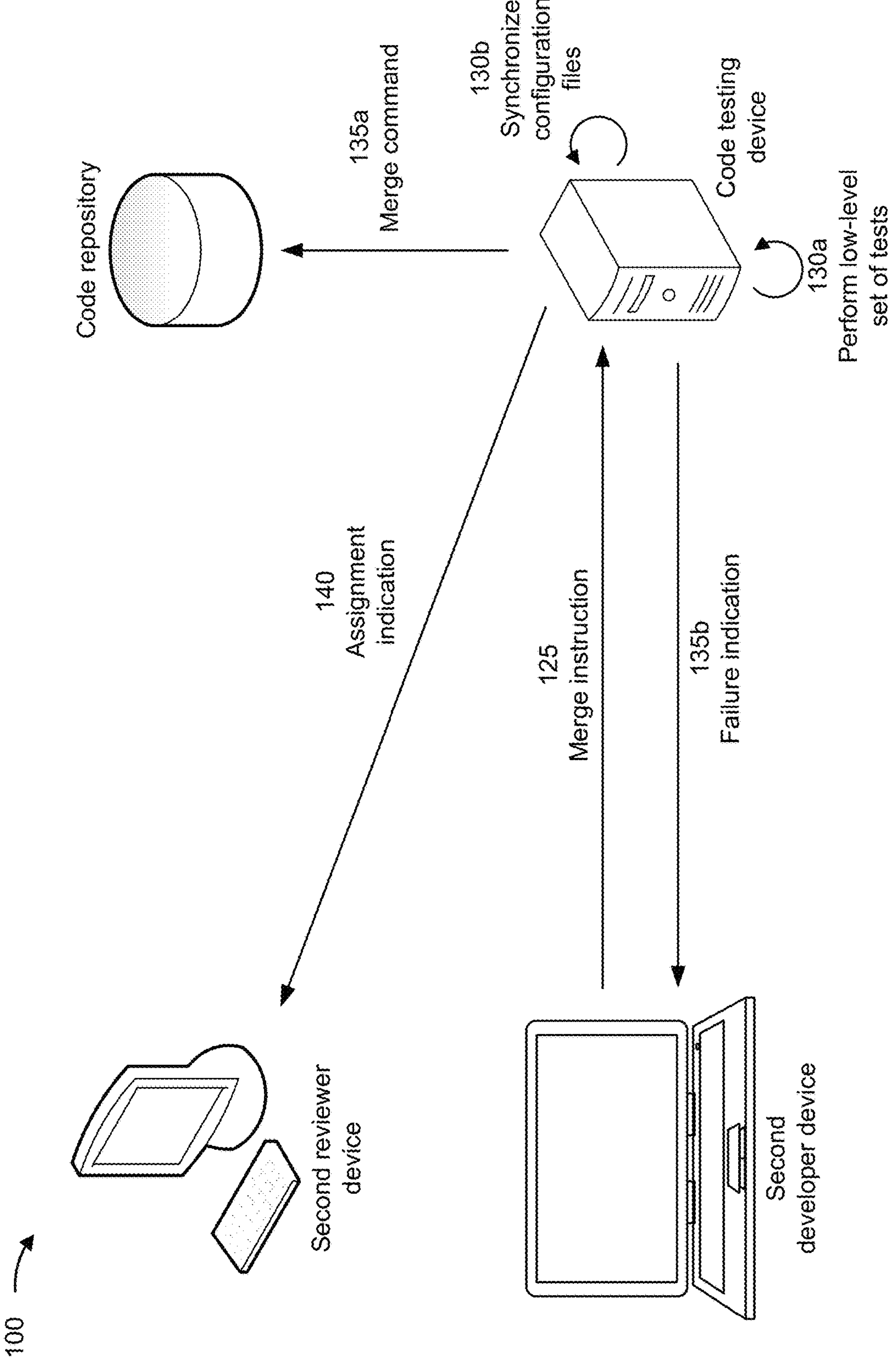

The operations described in connection with FIG. 1A are scalable to multiple developers. For example, as shown in FIG. 1B and by reference number 125, a second developer device may transmit, and the code testing device may receive, a second instruction to merge a second code branch. For example, a second developer may have modified code using the second developer device and may transmit the second instruction to merge the second code branch, including the modified code, into a parent branch. The second code branch may therefore include a portion of the larger set of code for the software application (e.g., when the first and second developers are working on different parts of the same software application). In some implementations, the second instruction may be a push command associated with the code repository. The second developer device may transmit the second instruction similarly as is described above for the first developer device transmitting the first instruction. Although example 100 is described in connection with the second developer, other examples may include the modified code being contributed by a second developer team.

In order to enable the second and first developers to contribute code to a same software application, the code testing device may synchronize configuration files associated with sessions for the first and second developers, as shown by reference number 130*a*. For example, the configuration files may store metadata associated with the code that is modified by the first and second developers. Accordingly, changes made by the first developer may be reflected in metadata associated with a session used by the second developer, and changes made by the second developer may be reflected in metadata associated with a session used by the first developer.

As shown by reference number 130*b*, the code testing device may perform the first set of tests associated with the first environment. The first set of tests may be low-level environment tests, as described above. Therefore, the code testing device performs shift left testing (e.g., moving testing toward a developer side rather than a production side). The code testing device may automatically perform the first set of tests on the second code branch in response to the second instruction. As a result, the code testing device helps prevent failures in higher-level environment tests (e.g., as described in connection with FIGS. 1C-1D) that would otherwise waste power and processing resources in debugging and repair processes. The code testing device may perform the first set of tests on the second code branch similarly as is described above for the first code branch.

As shown by reference number 135*a*, the code testing device may merge the second code branch based on the first set of tests resulting in a passing outcome for the second code branch. For example, the code testing device may forward a push command (e.g., as described above) from the second developer device to the code repository in response to receiving an indication of the passing outcome. The code testing device may forward a message including the push command or may decode a message from the second developer device including the push command, generate a new message re-encoding the push command, and transmit the new message to the code repository.

Alternatively, as shown by reference number 135*b*, the code testing device may refrain from merging the second code branch based on the first set of tests resulting in a failed outcome for the second code branch. For example, the code testing device may transmit, and the second developer device may receive, an indication of the failed outcome (e.g., in response to a push command from the second developer device, as described above). By blocking the push command associated with the code repository, the code testing device prevents problems in the second code branch from propagating to parent branches and causing failures in higher-level environment tests (e.g., as described in connection with FIGS. 1C-1D). Therefore, the second developer may further modify the code to address the failed outcome and re-transmit the second instruction at a later time.

The code testing device may assign the merged second code branch to a second reviewer. For example, the code testing device may select the second reviewer from a set of possible reviewers, where the set is associated with a parent branch into which the second code branch was merged. In some implementations, the code testing device may assign the merged second code branch by submitting a pull request to the code repository. Additionally, or alternatively, as shown by reference number 140, the code testing device may transmit, and a second reviewer device (associated with the second reviewer) may receive, an indication indicating the merged second code branch. The indication may be included in a push notification and/or another type of notification output by an output component of the second reviewer device. Additionally, or alternatively, the code testing device may transmit the indication to an email address (e.g., in an email message) and/or to the phone number (e.g., in a text message) associated with the second reviewer device.

The operations described in connection with FIGS. 1A-1B are scalable to multiple environments as well. For example, the first developer (or first developer team) may contribute code, for a software application, that is tested in one environment, and the second developer (or second developer team) may contribute code, for the software application, that is tested in a different environment. Accordingly, the code testing device may automatically test different components of the software application in different environments.

Figure 1C:
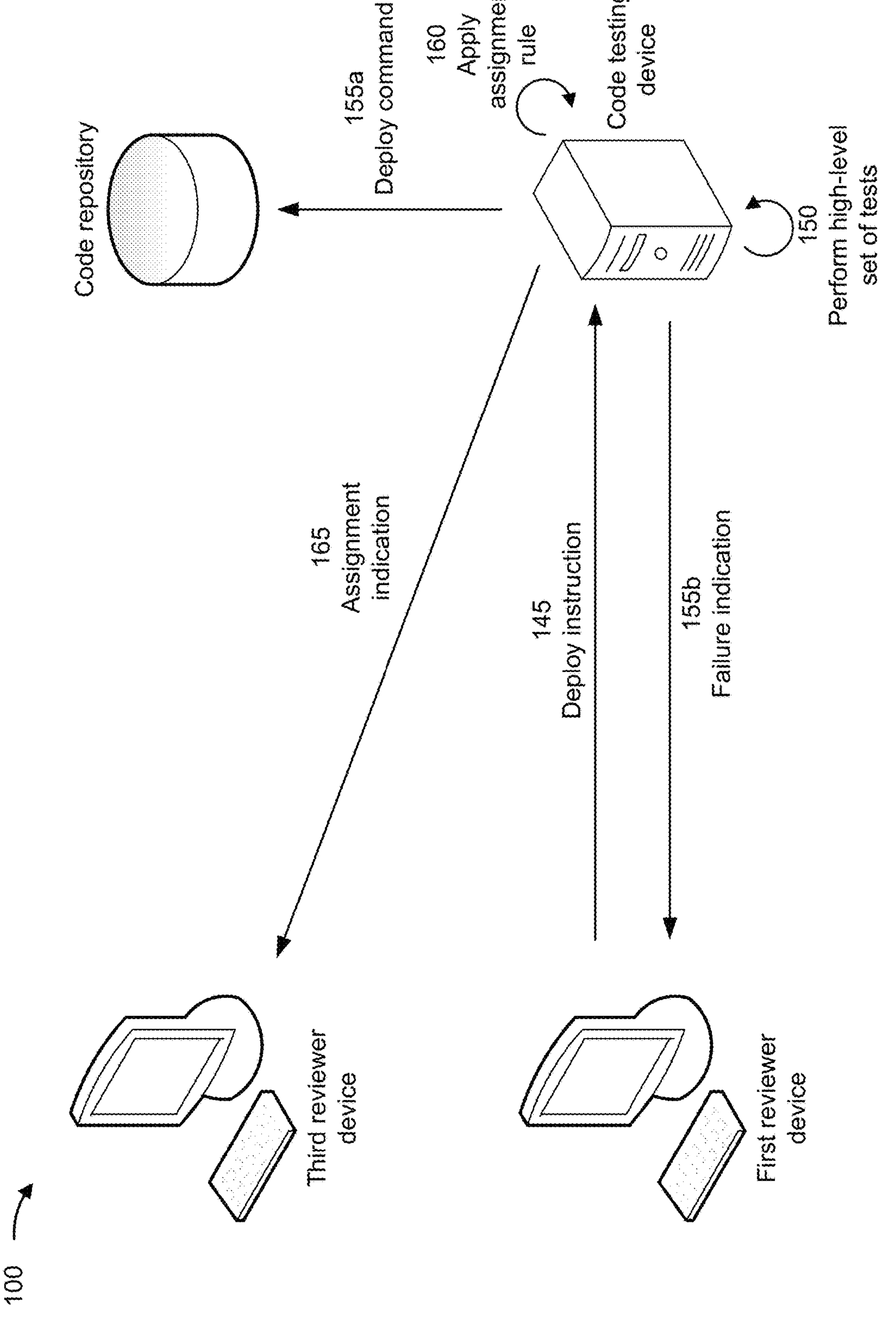

The code testing device may automatically apply higher-level tests as merged code branches move forward in review. In other words, the operations described in connection with FIGS. 1A-1B are scalable across a development process. For example, as shown in FIG. 1C, reviewers may approve merged code branches for further merging with parent branches.

As shown by reference number 145, the first reviewer device may transmit, and the code testing device may receive, a third instruction to further deploy the merged first code branch. For example, the first reviewer may have reviewed the first code branch using the first reviewer device and may transmit the third instruction. In some implementations, the third instruction may be a push command associated with the code repository. The first reviewer device may transmit the third instruction similarly as is described above for the first developer device transmitting the first instruction.

In some implementations, the first reviewer device may transmit, and the code testing device may receive, a set of credentials (e.g., a username and password, a passcode, a certificate, a key, biometric information, among other examples) associated with the first reviewer. Therefore, the code testing device may receive the third instruction based on verifying the set of credentials (e.g., by opening an API function that the first reviewer device uses to transmit the third instruction). Alternatively, the first reviewer device may communicate with an SSO service (e.g., associated with the code repository) and may receive the first instruction based on validating the first reviewer device using the SSO service.

As shown by reference number 150, the code testing device may perform a second set of tests associated with a second environment. The second set of tests may be quality assurance tests (e.g., fault injection, among other examples) and/or performance tests (e.g., load testing, volume testing, and/or stress testing, among other examples). In some cases, the second set of tests may be referred to as "quality gates" or may be used to control artifact promotion. The code testing device may automatically perform the second set of tests on the merged first code branch in response to the third instruction. As a result, the code testing device helps prevent failures of the deployed code (e.g., as described in connection with FIG. 1E) that would otherwise waste power and processing resources in debugging and repairing the deployed code. In some implementations, the code testing device may move the executable (e.g., compiled from the first code branch, as described above) to a simulator of the second environment (e.g., a container configured to simulate the second environment) and may test the executable in the simulator.

As shown by reference number 155*a*, the code testing device may deploy the merged first code branch based on the second set of tests resulting in a passing outcome for the merged first code branch. For example, the code testing device may forward a command from the first reviewer device to the code repository in response to receiving an indication of the passing outcome. The code testing device may forward a message including the command or may decode a message from the first reviewer device including the command, generate a new message re-encoding the command, and transmit the new message to the code repository.

Alternatively, as shown by reference number 155*b*, the code testing device may refrain from deploying the merged first code branch based on the second set of tests resulting in a failed outcome for the merged first code branch. For example, the code testing device may transmit, and the first reviewer device may receive, an indication of the failed outcome (e.g., in response to a command from the first reviewer device). By blocking the command, the code testing device prevents failures of the deployed code (e.g., as described in connection with FIG. 1E). Therefore, the first reviewer may further modify the code to address the failed outcome and re-transmit the third instruction at a later time.

The code testing device may assign the deployed first code branch to a third reviewer. For example, the code testing device may select the third reviewer from a set of possible reviewers, where the set is associated with a deployment environment into which the merged first code branch was deployed. Additionally, as shown by reference number 160, the code testing device may apply a rule that prevents the first reviewer from being assigned multiple times to a same branch. Accordingly, the code testing device may select the third reviewer based on applying the rule.

In some implementations, the code testing device may assign the deployed first code branch by submitting a pull request to the code repository. Additionally, or alternatively, as shown by reference number 165, the code testing device may transmit, and a third reviewer device (associated with the third reviewer) may receive, an indication indicating the deployed first code branch. The indication may be included in a push notification and/or another type of notification output by an output component of the third reviewer device. Additionally, or alternatively, the code testing device may transmit the indication to an email address (e.g., in an email message) and/or to the phone number (e.g., in a text message) associated with the third reviewer device.

Figure 1D:
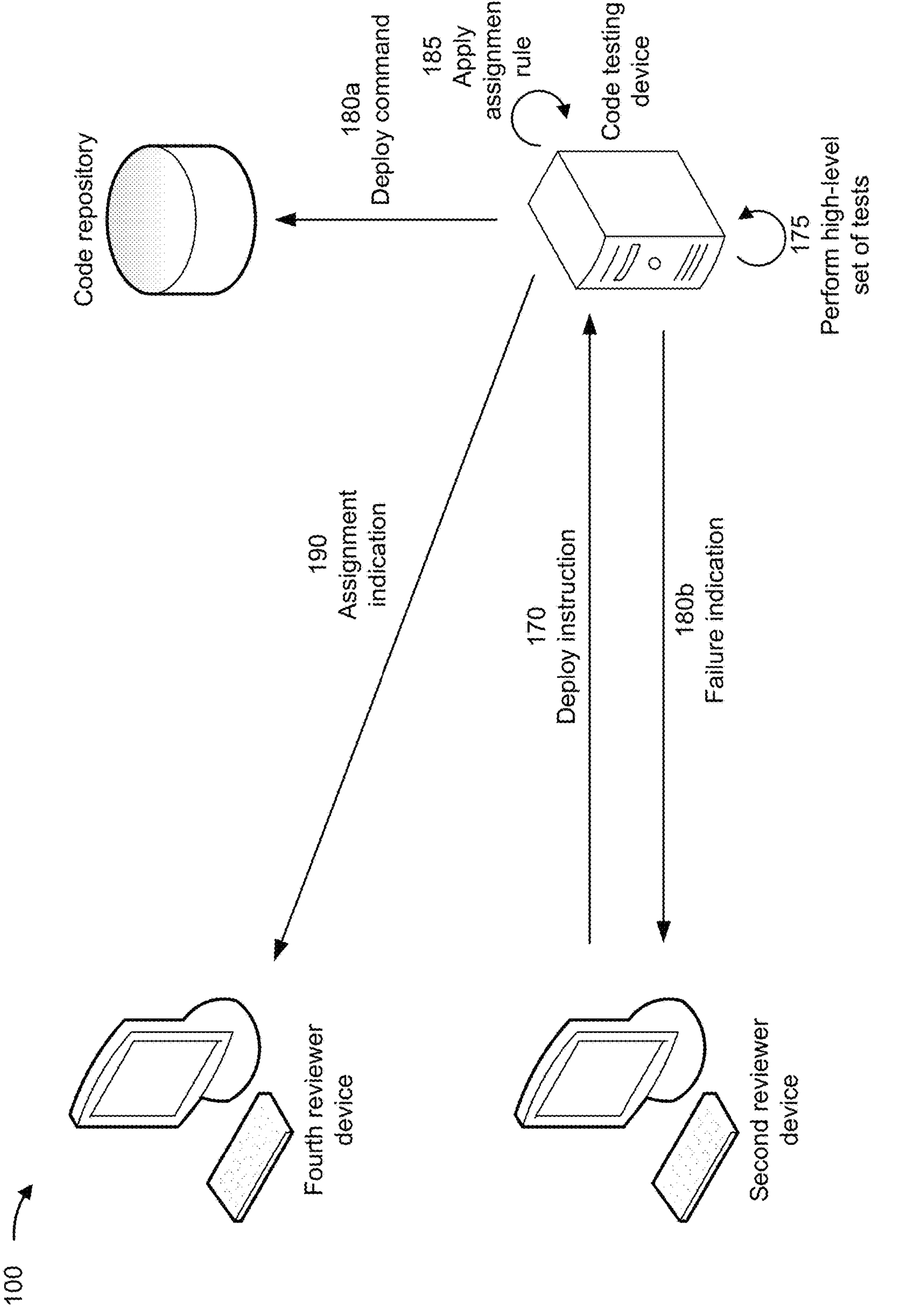

The operations described in connection with FIG. 1C are scalable to multiple reviewers. For example, as shown in FIG. 1D and by reference number 170, the second reviewer device may transmit, and the code testing device may receive, a fourth instruction to further deploy the merged second code branch. For example, the second reviewer may have reviewed the second code branch using the second reviewer device and may transmit the third instruction. In some implementations, the fourth instruction may be a push command associated with the code repository. The second reviewer device may transmit the fourth instruction similarly as is described above for the first developer device transmitting the first instruction.

As shown by reference number 175, the code testing device may perform the second set of tests associated with the second environment. The second set of tests may be quality assurance tests and/or performance tests, as described above. The code testing device may automatically perform the second set of tests on the merged second code branch in response to the fourth instruction. As a result, the code testing device helps prevent failures of the deployed code (e.g., as described in connection with FIG. 1E) that would otherwise waste power and processing resources in debugging and repairing the deployed code. The code testing device may perform the second set of tests on the merged second code branch similarly as is described above for the merged first code branch.

As shown by reference number 180*a*, the code testing device may deploy the merged second code branch based on the second set of tests resulting in a passing outcome for the merged second code branch. For example, the code testing device may forward a command from the second reviewer device to the code repository in response to receiving an indication of the passing outcome. The code testing device may forward a message including the command or may decode a message from the second reviewer device including the command, generate a new message re-encoding the command, and transmit the new message to the code repository.

Alternatively, as shown by reference number 180*b*, the code testing device may refrain from deploying the merged second code branch based on the second set of tests resulting in a failed outcome for the merged second code branch. For example, the code testing device may transmit, and the second reviewer device may receive, an indication of the failed outcome (e.g., in response to a command from the second reviewer device). By blocking the command, the code testing device prevents failures of the deployed code (e.g., as described in connection with FIG. 1E). Therefore, the second reviewer may further modify the code to address the failed outcome and re-transmit the fourth instruction at a later time.

The code testing device may assign the deployed second code branch to a fourth reviewer. For example, the code testing device may select the fourth reviewer from a set of possible reviewers, where the set is associated with a deployment environment into which the merged second code branch was deployed. Additionally, as shown by reference number 185, the code testing device may apply a rule that prevents the second reviewer from being assigned multiple times to a same branch. Accordingly, the code testing device may select the fourth reviewer based on applying the rule.

In some implementations, the code testing device may assign the deployed second code branch by submitting a pull request to the code repository. Additionally, or alternatively, as shown by reference number 190, the code testing device may transmit, and a fourth reviewer device (associated with the fourth reviewer) may receive, an indication indicating the deployed second code branch. The indication may be included in a push notification and/or another type of notification output by an output component of the fourth reviewer device. Additionally, or alternatively, the code testing device may transmit the indication to an email address (e.g., in an email message) and/or to the phone number (e.g., in a text message) associated with the fourth reviewer device.

Figure 1E:
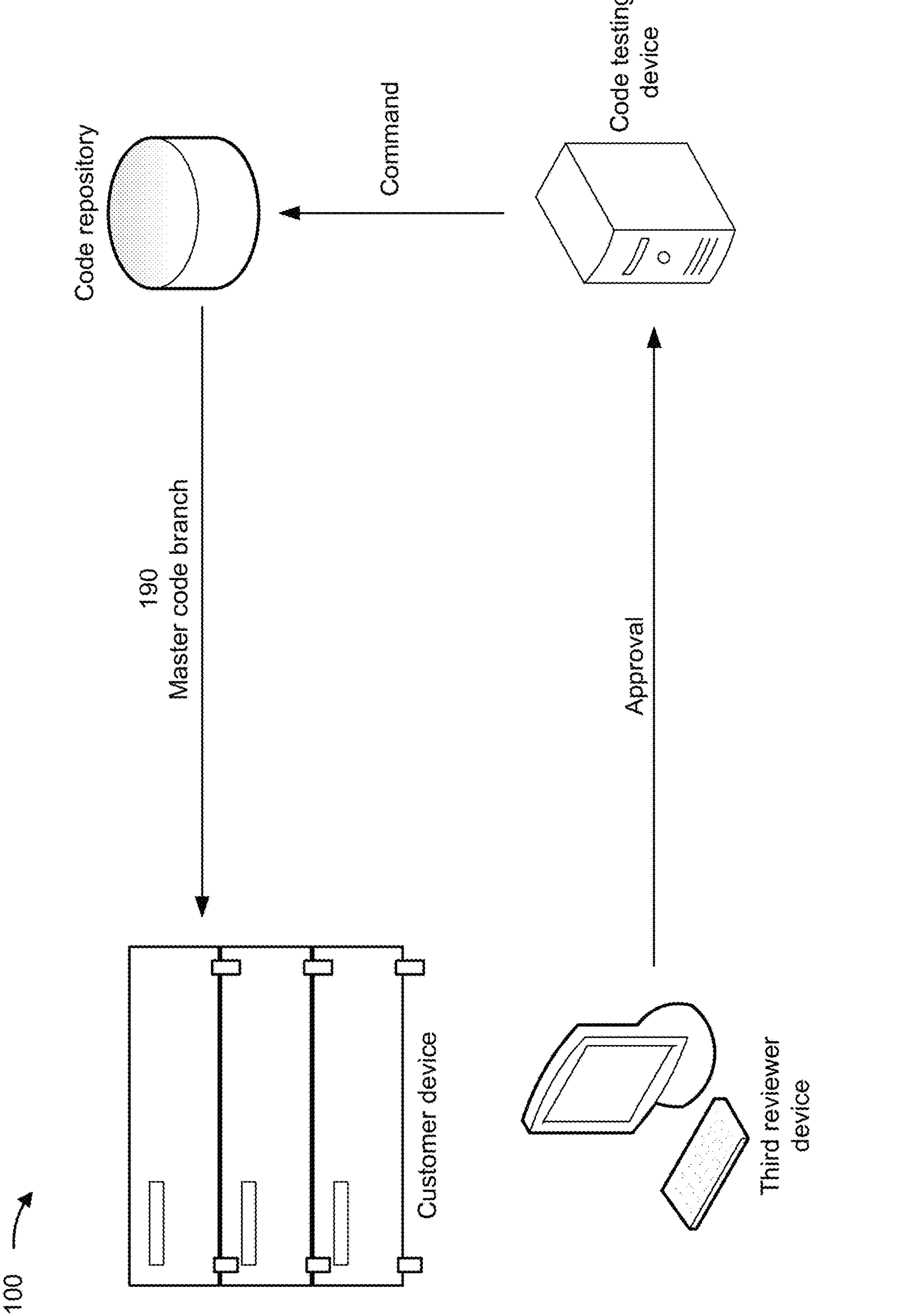

The operations described in connection with FIGS. 1C-1D are further scalable across multiple levels of review. For example, although the example 100 is described with one round of merging and one round of deployment, additional rounds of merging and/or deployment may be included in other examples. At a final level of review, as shown in FIG. 1E, a final reviewer (e.g., the third reviewer in the example 100) may approve the software application. Accordingly, the third reviewer device may transmit, and the code testing device may receive, an approval of the deployed first code branch. Therefore, as shown by reference number 190, the code repository may transmit, and the customer device may receive, a master code branch that includes the deployed first code branch. For example, the code testing device may forward a command from the third reviewer device to the code repository in order to transmit the master code branch to the customer device. The code testing device may forward a message including the command or may decode a message from the third reviewer device including the command, generate a new message re-encoding the command, and transmit the new message to the code repository.

By using techniques as described in connection with FIGS. 1A-1E, the code testing device automatically tests code before merging code branches. As a result, failures in higher-level tests are prevented that would otherwise waste power and processing resources in debugging and repairing the merged code branches. Additionally, the code testing device automatically tests merged code branches before deployment. As a result, failures are prevented that would otherwise waste power and processing resources in debugging and repairing the deployed code branches.

As indicated above, FIGS. 1A-1E are provided as an example. Other examples may differ from what is described with regard to FIGS. 1A-1E.

Figure 2:
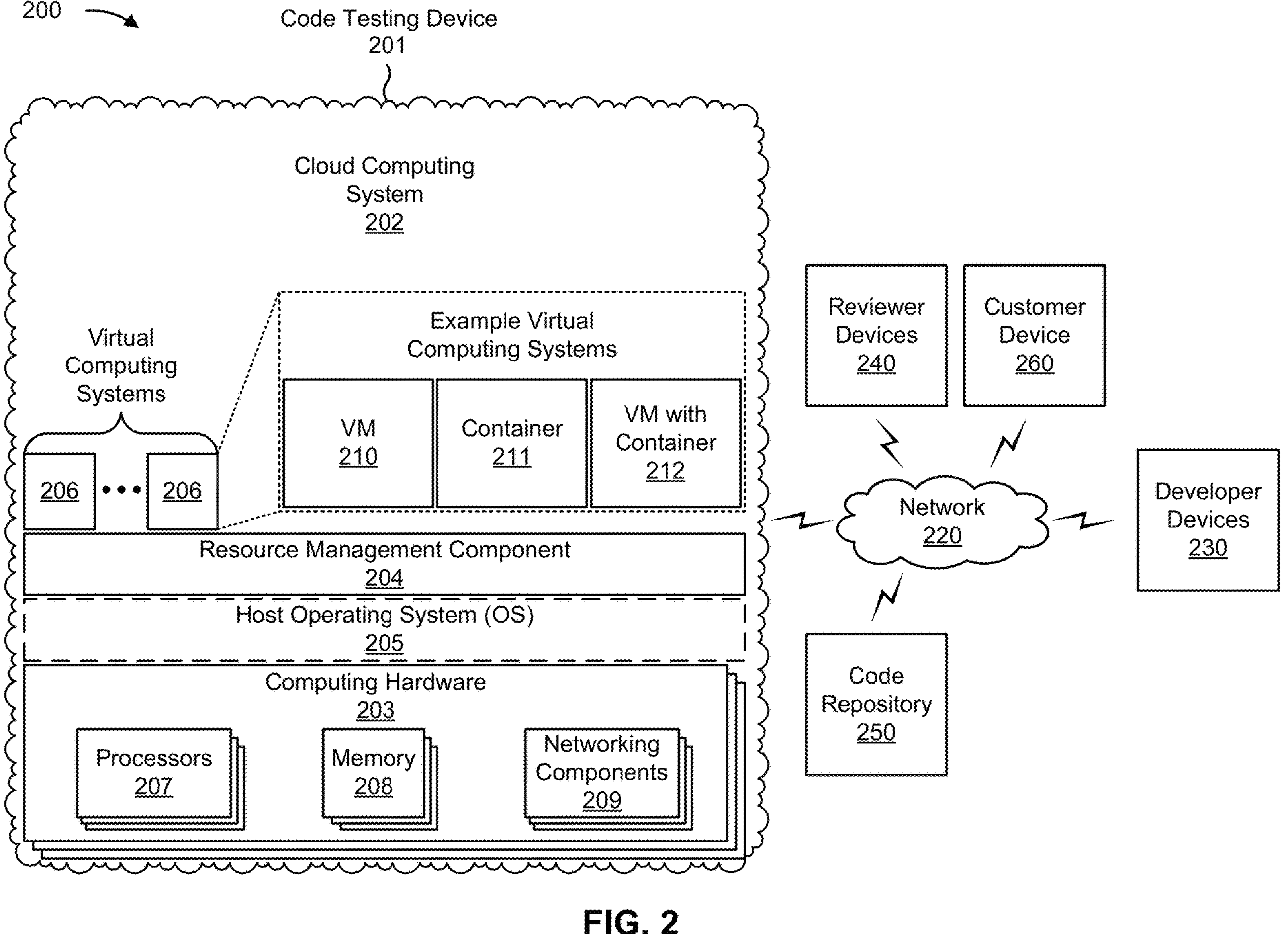
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a code testing device 201, which may include one or more elements of and/or may execute within a cloud computing system 202. The cloud computing system 202 may include one or more elements 203-212, as described in more detail below. As further shown in FIG. 2, environment 200 may include a network 220, developer devices 230, reviewer devices 240, a code repository 250, and/or a customer device 260. Devices and/or elements of environment 200 may interconnect via wired connections and/or wireless connections.

The cloud computing system 202 may include computing hardware 203, a resource management component 204, a host OS 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the code testing device 201 may include one or more elements 203-212 of the cloud computing system 202, may execute within the cloud computing system 202, and/or may be hosted within the cloud computing system 202, in some implementations, the code testing device 201 may not be cloud-based (e.g., may be implemented outside of a cloud computing system) or may be partially cloud-based. For example, the code testing device 201 may include one or more devices that are not part of the cloud computing system 202, such as device 300 of FIG. 3, which may include a standalone server or another type of computing device. The code testing device 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The developer devices 230 may include devices capable of receiving, generating, storing, processing, and/or providing information associated with code, as described elsewhere herein. The developer devices 230 may include communication devices and/or computing devices. For example, the developer devices 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The developer devices 230 may communicate with one or more other devices of environment 200, as described elsewhere herein.

The reviewer devices 240 may include devices capable of receiving, generating, storing, processing, and/or providing information associated with code branches, as described elsewhere herein. The reviewer devices 240 may include communication devices and/or computing devices. For example, the reviewer devices 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The reviewer devices 240 may communicate with one or more other devices of environment 200, as described elsewhere herein.

The code repository 250 may include one or more devices capable of receiving, generating, storing, processing, and/or providing information associated with code, as described elsewhere herein. The code repository 250 may include a communication device and/or a computing device. For example, the code repository 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The code repository 250 may communicate with one or more other devices of environment 200, as described elsewhere herein.

The customer device 260 may include one or more devices capable of receiving, generating, storing, processing, and/or providing information associated with deployed code, as described elsewhere herein. The customer device 260 may include a communication device and/or a computing device. For example, the customer device 260 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The customer device 260 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
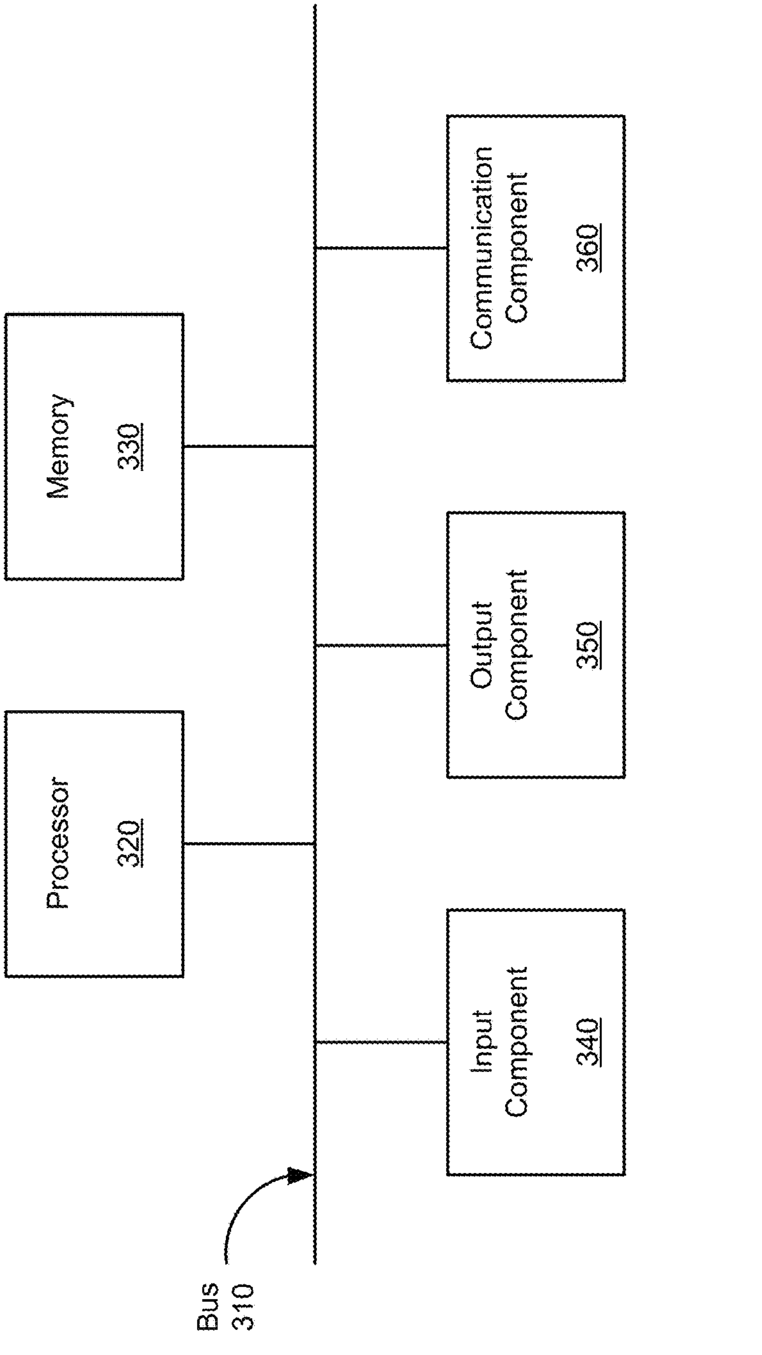
FIG. 3 is a diagram of example components of one or more devices of FIG. 2, in accordance with some embodiments of the present disclosure.

FIG. 3 is a diagram of example components of a device 300 associated with scalable and automated code testing. The device 300 may correspond to a developer device 230, a reviewer device 240, a code repository 250, and/or a customer device 260. In some implementations, a developer device 230, a reviewer device 240, a code repository 250, and/or a customer device 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory).

The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
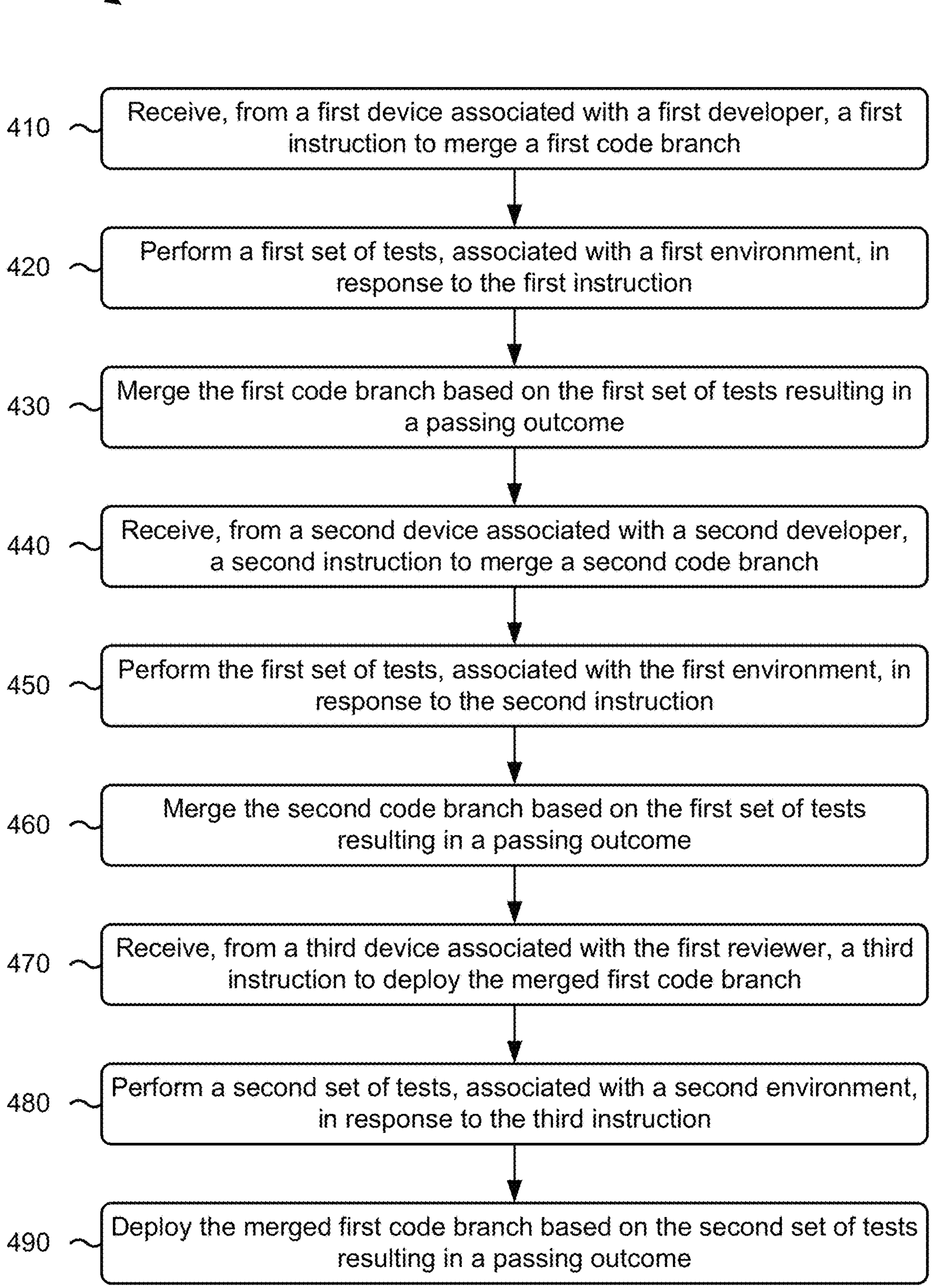
FIG. 4 is a flowchart of an example process relating to scalable and automated code testing, in accordance with some embodiments of the present disclosure.

FIG. 4 is a flowchart of an example process 400 associated with scalable and automated code testing. In some implementations, one or more process blocks of FIG. 4 may be performed by the code testing device 201. In some implementations, one or more process blocks of FIG. 4 may be performed by another device or a group of devices separate from or including the code testing device 201, such as a developer device 230, a reviewer device 240, a code repository 250, and/or a customer device 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a first device associated with a first developer, a first instruction to merge a first code branch (block 410). For example, the code testing device 201 (e.g., using processor 320, memory 330, input component 340, and/or communication component 360) may receive, from a first device associated with a first developer, a first instruction to merge a first code branch, as described above in connection with reference number 105 of FIG. 1A. As an example, a first developer may have modified code using the first device associated with the first developer, and thus the first device may transmit the first instruction to the code testing device 201 to merge the first code branch, including the modified code, into a parent branch.

As further shown in FIG. 4, process 400 may include performing a first set of tests, associated with a first environment, in response to the first instruction (block 420). For example, the code testing device 201 (e.g., using processor 320 and/or memory 330) may perform a first set of tests, associated with a first environment, in response to the first instruction, as described above in connection with reference number 110 of FIG. 1A. As an example, the code testing device 201 may compile the first code branch (including modified code from the first device associated with the first developer) to generate an executable and may test the executable within a container configured to simulate the first environment.

As further shown in FIG. 4, process 400 may include merging the first code branch based on the first set of tests resulting in a passing outcome for the first code branch (block 430). For example, the code testing device 201 (e.g., using processor 320 and/or memory 330) may merge the first code branch based on the first set of tests resulting in a passing outcome for the first code branch, as described above in connection with reference number 115*a* of FIG. 1A. As an example, the code testing device 201 may forward a push command from the first device associated with the first developer to a code repository in response to receiving an indication of the passing outcome.

As further shown in FIG. 4, process 400 may include receiving, from a second device associated with a second developer, a second instruction to merge a second code branch (block 440). For example, the code testing device 201 (e.g., using processor 320, memory 330, input component 340, and/or communication component 360) may receive, from a second device associated with a second developer, a second instruction to merge a second code branch, as described above in connection with reference number 125 of FIG. 1B. As an example, a second developer may have modified code using the second device associated with the second developer, and thus the second device may transmit the second instruction to the code testing device 201 to merge the second code branch, including the modified code, into a parent branch.

As further shown in FIG. 4, process 400 may include performing the first set of tests, associated with the first environment, in response to the second instruction (block 450). For example, the code testing device 201 (e.g., using processor 320 and/or memory 330) may perform the first set of tests, associated with the first environment, in response to the second instruction, as described above in connection with reference number 130*b* of FIG. 1B. As an example, the code testing device 201 may compile the second code branch (including modified code from the second device associated with the second developer) to generate an executable and may test the executable within a container configured to simulate the first environment.

As further shown in FIG. 4, process 400 may include merging the second code branch based on the first set of tests resulting in a passing outcome for the second code branch (block 460). For example, the code testing device 201 (e.g., using processor 320 and/or memory 330) may merge the second code branch based on the first set of tests resulting in a passing outcome for the second code branch, as described above in connection with reference number 135*a* of FIG. 1B. As an example, the code testing device 201 may forward a push command from the second device associated with the second developer to the code repository in response to receiving an indication of the passing outcome.

As further shown in FIG. 4, process 400 may include receiving, from a third device associated with a first reviewer, a third instruction to deploy the merged first code branch (block 470). For example, the code testing device 201 (e.g., using processor 320, memory 330, input component 340, and/or communication component 360) may receive, from a third device associated with a first reviewer, a third instruction to deploy the merged first code branch, as described above in connection with reference number 145 of FIG. 1C. As an example, a first reviewer may have reviewed the first code branch using the third device associated with the first reviewer, and thus the third device may transmit the third instruction to deploy the merged first code branch.

As further shown in FIG. 4, process 400 may include performing a second set of tests, associated with a second environment, in response to the third instruction (block 480). For example, the code testing device 201 (e.g., using processor 320 and/or memory 330) may perform a second set of tests, associated with a second environment, in response to the third instruction, as described above in connection with reference number 150 of FIG. 1C. As an example, the code testing device 201 may move the executable (e.g., compiled from the first code branch, as described above) to a simulator of the second environment (e.g., a container configured to simulate the second environment) and may test the executable in the simulator.

As further shown in FIG. 4, process 400 may include deploying the merged first code branch based on the second set of tests resulting in a passing outcome for the merged first code branch (block 490). For example, the code testing device 201 (e.g., using processor 320 and/or memory 330) may deploy the merged first code branch based on the second set of tests resulting in a passing outcome for the merged first code branch, as described above in connection with reference number 155*a* of FIG. 1C. As an example, the code testing device 201 may forward a command from the third device associated with the first reviewer to the code repository in response to receiving an indication of the passing outcome.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for scalable and automated code testing, the system comprising:
- one or more memories; and
- one or more processors, communicatively coupled to the one or more memories, configured to:
  - receive, from a first device associated with a first developer, a first instruction to merge a first code branch;
  - perform a first set of tests, associated with a first environment, in response to the first instruction;
  - merge the first code branch based on the first set of tests resulting in a passing outcome for the first code branch;
  - assign the merged first code branch to a first reviewer;
  - receive, from a second device associated with a second developer, a second instruction to merge a second code branch;
  - perform the first set of tests, associated with the first environment, in response to the second instruction;
  - synchronize configuration files associated with sessions for the first developer and the second developer, wherein the configuration files store metadata associated with the first code branch and the second code branch;
  - merge the second code branch based on the first set of tests resulting in a passing outcome for the second code branch;
  - assign the merged second code branch to a second reviewer;
  - receive, from a third device associated with the first reviewer, a third instruction to deploy the merged first code branch;
  - perform a second set of tests, associated with a second environment, in response to the third instruction;
  - deploy the merged first code branch based on the second set of tests resulting in a passing outcome for the merged first code branch; and
  - assign, based on applying a rule that limits each reviewer to being assigned to a same branch up to one time, the deployed first code branch to a third reviewer that is different than the first reviewer.

2. The system of claim 1, wherein the one or more processors are configured to:
- receive, from a fourth device associated with the second reviewer, a fourth instruction to deploy the merged second code branch;
- perform the second set of tests, associated with the second environment, in response to the fourth instruction;
- deploy the merged second code branch based on the second set of tests resulting in a passing outcome for the merged second code branch; and
- assign the deployed second code branch to a fourth reviewer that is different than the second reviewer.

3. The system of claim 1, wherein the one or more processors, to receive the first instruction, are configured to:
- receive a push command associated with a code repository.

4. The system of claim 1, wherein the one or more processors, to assign the merged first code branch to a first reviewer, are configured to:
- submit a pull request to a code repository.

5. The system of claim 1, wherein the first set of tests comprise low-level environment tests.

6. The system of claim 1, wherein the second set of tests comprise quality assurance tests.

7. A method of scalable and automated code testing, comprising:
- receiving, from a first device associated with a first developer, a first instruction to merge a first code branch;
- performing, by a code testing device, a first set of tests, associated with a first environment, in response to the first instruction;
- merging, by a code repository, the first code branch based on the first set of tests resulting in a passing outcome for the first code branch;
- receiving, from a second device associated with a second developer, a second instruction to merge a second code branch;
- performing, by the code testing device, the first set of tests, associated with the first environment, in response to the second instruction;
- synchronizing configuration files associated with sessions for the first developer and the second developer, wherein the configuration files store metadata associated with the first code branch and the second code branch;
- merging, by the code repository, the second code branch based on the first set of tests resulting in a passing outcome for the second code branch;
- receiving, from a third device associated with a first reviewer, a third instruction to deploy the merged first code branch;
- performing, by the code testing device, a second set of tests, associated with a second environment, in response to the third instruction;
- deploying, by the code repository, the merged first code branch based on the second set of tests resulting in a passing outcome for the merged first code branch; and
- assigning, based on applying a rule that limits each reviewer to being assigned to a same branch up to one time, the deployed first code branch to a second reviewer that is different than the first reviewer.

8. The method of claim 7, further comprising:

receiving, from a fourth device associated with the second reviewer, a fourth instruction to deploy the merged second code branch;

performing, by the code testing device, the second set of tests, associated with the second environment, in response to the fourth instruction; and deploying, by the code repository, the merged second code branch based on the second set of tests resulting in a passing outcome for the merged second code branch.

9. The method of claim 7, further comprising:

receiving, from a fourth device associated with the second reviewer, a fourth instruction to deploy the merged second code branch;

performing, by the code testing device, the second set of tests, associated with the second environment, in response to the fourth instruction; and refraining from deploying the merged second code branch based on the second set of tests resulting in a failed outcome for the merged second code branch.

10. The method of claim 7, wherein performing the first set of tests comprises:

compiling the first code branch to generate an executable; and testing the executable within a container configured to simulate the first environment.

11. The method of claim 10, wherein performing the second set of tests comprises:

moving the executable to a simulator of the second environment; and testing the executable in the simulator.

12. The method of claim 7, the first set of tests comprise quality assurance tests.

13. The method of claim 7, wherein the second set of tests comprise performance tests.

14. A non-transitory computer-readable medium storing a set of instructions for scalable and automated code testing, the set of instructions comprising:

one or more instructions that, when executed by one or more processors of a device, cause the device to:

receive, from a device associated with a developer, a first instruction to merge a code branch;

perform a first set of tests, associated with a first environment, in response to the first instruction;

synchronize configuration files associated with sessions for the developer and a different developer, wherein the configuration files store metadata associated with the code branch;

merge the code branch based on the first set of tests resulting in a passing outcome for the code branch;

assign the merged code branch to a first reviewer;

receive, from a device associated with the first reviewer, a second instruction to deploy the merged code branch;

perform a second set of tests, associated with a second environment, in response to the second instruction;

deploy the merged code branch based on the second set of tests resulting in a passing outcome for the merged code branch; and assign, based on applying a rule that limits each reviewer to being assigned to a same branch up to one time, the deployed code branch to a second reviewer that is different than the first reviewer.

15. The non-transitory computer-readable medium of claim 14, wherein the one or more instructions, when executed by the one or more processors, cause the device to:

receive, from the device associated with the developer, a third instruction to merge an additional code branch;

perform the first set of tests, associated with the first environment, in response to the third instruction; and refrain from merging the additional code branch based on the first set of tests resulting in a failed outcome for the additional code branch.

16. The non-transitory computer-readable medium of claim 14, wherein the one or more instructions, when executed by the one or more processors, cause the device to:

receive, from a device associated with the second reviewer, an approval of the deployed code branch; and transmit a master code branch, including the deployed code branch, to a device associated with a customer.

17. The non-transitory computer-readable medium of claim 14, wherein the one or more instructions, that cause the device to assign the merged code branch to the first reviewer, cause the device to:

transmit an indication, to the device associated with the first reviewer, indicating the merged code branch.

18. The non-transitory computer-readable medium of claim 14, wherein the one or more instructions, that cause the device to assign the deployed code branch to the second reviewer, cause the device to:

select the second reviewer based on the rule.

19. The non-transitory computer-readable medium of claim 14, wherein the one or more instructions, that cause the device to receive the first instruction, cause the device to:

receive a set of credentials associated with the developer; and receive the first instruction based on verifying the set of credentials.

20. The non-transitory computer-readable medium of claim 14, wherein the one or more instructions, that cause the device to receive the second instruction, cause the device to:

receive a set of credentials associated with the first reviewer; and receive the second instruction based on verifying the set of credentials.

* * * * *